(12) United States Patent
Aslanian

(10) Patent No.: US 7,251,484 B2
(45) Date of Patent: Jul. 31, 2007

(54) BASE UNIT FOR COMMUNICATING WITH A CELLULAR TELEPHONE

(75) Inventor: Berge H. Aslanian, La Jolla, CA (US)

(73) Assignee: Tomotu, Inc., Cape Coral, FL (US)

( * ) Notice: Subject to any disclaimer, the term of this patent is extended or adjusted under 35 U.S.C. 154(b) by 218 days.

(21) Appl. No.: 10/865,492

(22) Filed: Jun. 9, 2004

(65) Prior Publication Data

US 2005/0020258 A1    Jan. 27, 2005

Related U.S. Application Data

(60) Provisional application No. 60/477,412, filed on Jun. 9, 2003, provisional application No. 60/477,217, filed on Jun. 9, 2003.

(51) Int. Cl.
*H04Q 7/20* (2006.01)
*H04M 11/00* (2006.01)
*H04M 1/00* (2006.01)
*H04B 7/00* (2006.01)

(52) U.S. Cl. ............... 455/426.1; 405/406; 405/462; 405/465; 405/41.2; 379/428.03

(58) Field of Classification Search ........... 455/3.05, 455/3.06, 416–420, 422.1, 426.1–426.2, 455/41.2, 462–463, 465, 550.1, 551, 552.1, 455/553.1, 554.1, 554.2, 555, 556.1–556.2, 455/557, 561, 561.1, 569.1, 423–425, 41.1–41.3, 455/73–74, 74.1, 500, 405–409, 514, 517, 455/524–525, 566, 573, 575.1; 379/111, 379/112.06, 114.01, 114.03, 139–140, 428.01, 379/428.02, 428.03, 428.04, 433.05, 112.01
See application file for complete search history.

(56) References Cited

U.S. PATENT DOCUMENTS 5,684,861 A * 11/1997 Lewis et al. ............... 455/405
5,761,618 A * 6/1998 Lynch et al. ............... 455/419
6,073,031 A * 6/2000 Helstab et al. ............. 455/557
6,343,220 B1 * 1/2002 Van Der Salm .......... 455/552.1
6,445,911 B1 * 9/2002 Chow et al. ............... 455/406
6,606,507 B1 * 8/2003 Fujita ........................ 455/566
2002/0160791 A1 * 10/2002 Markowitz ................. 455/462
2003/0078071 A1 * 4/2003 Uchiyama ................... 455/557

(Continued)

OTHER PUBLICATIONS

Armstrong, Larry, "Technology & You", *Business Week*, Aug. 2, 2004, Editions: N. America/Europe/Asia/Edition Preference, pp. 1-2.

(Continued)

*Primary Examiner*—Meless Zewdu
(74) *Attorney, Agent, or Firm*—Townsend and Townsend and Crew

(57) ABSTRACT

Disclosed herein is a telecommunication system to be used with a cellular telephone network at a fixed location, including a portable cellular handset, a base unit having a recess for the portable cellular handset, a processor included in the base unit for processing information from the portable cellular handset, a display for displaying information processed by the processor, and controls for manipulating the information from the portable cellular handset. Also disclosed is a method of managing cellular telephone information associated with a particular cellular subscription, and wherein the cellular telephone information is downloaded from the portable cellular handset to the base unit.

21 Claims, 5 Drawing Sheets

U.S. PATENT DOCUMENTS

2003/0157929 A1* 8/2003 Janssen et al. .............. 455/416
2004/0131168 A1* 7/2004 Tischler ................ 379/207.15
2004/0152482 A1* 8/2004 Raffel et al. ................ 455/522
2004/0203738 A1* 10/2004 Janssen et al. ........... 455/426.1

OTHER PUBLICATIONS

E-mail alert, "Message Alert Standalone/Corded Telephones Centrex KSU-Less Telephone System/Universal Cell Phone Docking Station", from Phone Labs Technology Co., Sep. 3, 2004, pp. 1-2, at www.phonelabs.com/prd05.asp.

* cited by examiner

BASE UNIT FOR COMMUNICATING WITH A CELLULAR TELEPHONE

CROSS-REFERENCES TO RELATED APPLICATIONS

This application claims priority to U.S. Provisional Application No. 60/477,412 filed Jun. 9, 2003 and U.S. Provisional Application No. 60/477,217 filed Jun. 9, 2003 which are herein incorporated by reference for all purposes.

FIELD OF THE DISCLOSURE

The present disclosure relates to wireless telecommunications and, more particularly, a cellular phone system and method for utilizing cellular telephones and managing data relating to same.

BACKGROUND OF THE DISCLOSURE

Wireless telecommunications have advanced dramatically over the years with the improvement of CDMA and other wireless telecommunication standards and with the technical advancements and reduction in cost of the equipment required to establish a cellular telecommunications network. For example, to establish a cellular network, a distribution hub with several base stations can provide cellular telecommunications coverage to a relatively very large geographical area divided into cells.

With the technical advancements and reduction in costs to establish a cellular network, providing telephone coverage to remote locations has become a practicality with the installation of a cellular network system, however, to date no such systems, or relatively few, have been engineered or implemented to provide cellular telephone coverage to such locations.

Another disadvantage of existing cellular telephone systems is that based on the topography of the land where the base station is placed and the topography of the land surrounding the base station, the coverage area of the cell may not provide consistent signal strength or reliability in the signal. This is particularly the case for areas along the fringe of a cell and for users who are utilizing their cellular telephones indoors. In addition, weather may impact signal strength and signal reliability.

In addition, wireless telephones have become very popular with the advancements in technology and the lowered costs of owning a cellular telephone. Most wireless subscription plans include incentives to draw new subscribers, and these incentives typically include free evening and weekend minutes with a finite number of prime time minutes that may be used by the subscriber. In addition, most of the wireless telephones in use today include call data management features that allow the wireless telephone to keep track of minutes used by the user. This call data information is also available typically on the wireless subscription services website, wherein the user logs on to the website to view the night and weekend minutes that have been used, as well as the primetime minutes that have been used, as well as the remaining minutes left for that particular month's allocation of minutes. Nevertheless, it is difficult for users to keep track of the call data information, because typically it is not convenient to log on to the particular Internet site, and it may be difficult to keep track of each particular month's usage in each category that needs to be tracked.

BRIEF SUMMARY OF THE DISCLOSURE

Disclosed herein is a telecommunication system to be used with a cellular telephone network at a fixed location, including a portable cellular handset, a base unit having a recess for the portable cellular handset, a processor included in the base unit for processing information from the portable cellular handset, a display for displaying information processed by the processor, and controls for manipulating the information from the portable cellular handset.

Also disclosed is a telecommunication system including a portable handset, a base unit having a recess for the portable handset, a processor included in the base unit for processing information from the portable handset, a display for displaying information processed by the processor, and controls for manipulating the information from the portable handset. The telecommunication system may be utilized with the portable handset that is a cellular telephone and the telecommunication system may further include a cordless telephone that may be housed in the base unit. Further, the base unit may include a keypad for communicating with the portable handset or the base unit. The telecommunication system may further include a remote antenna connected to the base unit to provide a signal to the base unit.

Also disclosed herein is a method for managing cellular telephone information associated with a particular cellular subscription, including providing a portable cellular handset and a base unit having a recess for the portable cellular handset, the base unit including a processor for processing information from the portable cellular handset, and the base unit further having a display for displaying information processed by the processor, downloading information from the portable cellular handset to the base unit, processing the information downloaded from the portable cellular handset, displaying information downloaded from the portable cellular handset on the display, and providing controls on the base unit for manipulating the information downloaded from the portable handset.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Disclosed is a multi-functional base unit for a cellular telecommunications system. The base unit allows the user to utilize cellular telecommunications indoors, such as inside the user's house where previous cellular telecommunication systems may not have been available. The base unit, according to the present disclosure, includes a remote antenna that may be located, for example, on top of the home of the user or on top of an antenna on the user's property so that cellular signals may be captured by the base unit and ultimately the cellular telephone inside of the home or building, and if it was not for the use of the remote antenna, the cellular telephone may not capture the signal inside of the home or building.

Also disclosed is a device that allows a user to manage call information data from the user's cellular telephone so that the user may efficiently utilize call minute units allocated to the user under the user's subscription plan. For example, the user may track minutes used under the night and weekend unit allocation and the prime time unit allocation.

Also disclosed is a device and method that allows the user to manage call information data from the user's cellular telephone so that the user may efficiently utilize call minute units allocated to the user under the user's subscription plan. For example, the user may track minutes used under the night and weekend unit allocation and the prime time unit allocation.

Figure 1:
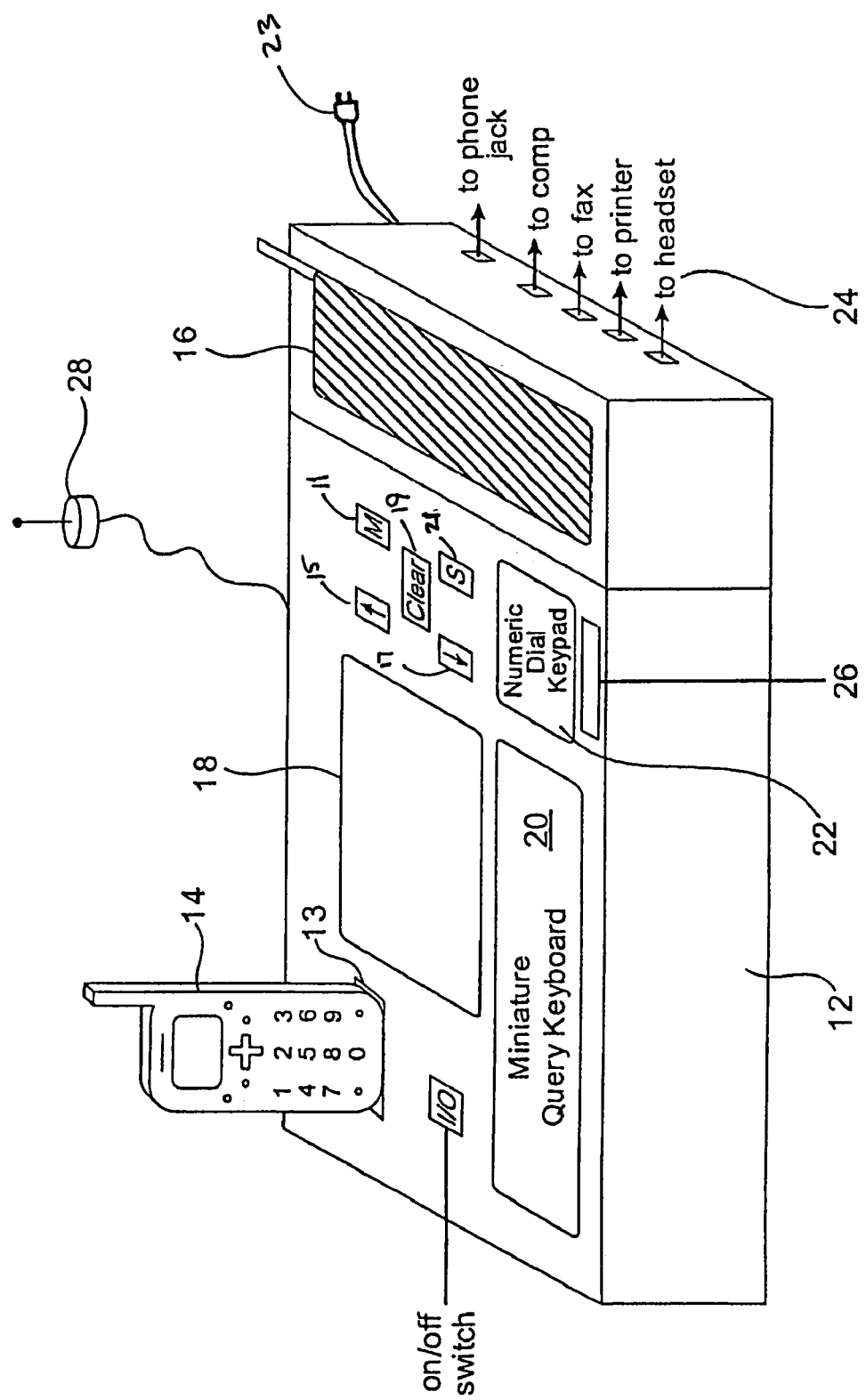
FIG. 1 is a perspective view of the multi-functional base unit which allows the user to manage wireless telecommunications data according to the present disclosure.

An exemplary embodiment of the present disclosure is shown in FIG. 1. The multi-functional base unit 10 includes a base 12 with a receptacle 13 for receiving a cellular telephone 14. The receptacle 13 includes the electrical connections necessary to allow the base 12 to electrically communicate with the cellular telephone 14. The electrical connections allow the base 12 to charge the cellular telephone while the cellular telephone is resting in the receptacle 13. The base unit 12 includes an electrical cord 23 for AC input to the base unit 12. In addition, the base 12 includes the software necessary to communicate with the cellular telephone 14 through the electrical connections in receptacle 13 so that information available in the cellular telephone, such as received calls, placed calls, and the stored electronic directory in the cellular telephone, may be displayed on the base 12, as will be further explained below.

The base 12 may also include a cordless landline telephone 16 and the receptacle for receiving the cordless telephone 16. A display 18 allows information to be displayed on the base 12 in which the display 18 is larger in size when compared to the typical display of a cellular telephone 14. This allows an ergonomic display to the user and may provide other advantages to users who are disadvantaged, such as those with poor or failing eyesight.

The base 12 also includes a miniature keyboard 20 and a numeric dial pad 22 so as to allow the user a means to communicate with the base 12 and the cellular telephone 14. The keyboard or keypad may, for example, allow the user to place calls on the cellular telephone from the keyboard or keypad or may allow the user to enter information or edit information in the cellular telephone's electronic directory. The base 12 also includes a speakerphone, a speakerphone switch 26 and the electrical circuits and connections 24 necessary so that the base 12 may communicate to and from a landline telephone jack, a computer, a telefacsimile machine, a printer and/or a user headset. The connections include phone jacks, such as RJ 11 jacks or DSL phone jacks to allow a landline telephone to be plugged into the base unit 12. In addition, the phone jacks allow the base unit to be connected to other peripheral devices, which may include those previously mentioned. Antenna 28 is electronically connected either through a wire or through RF communications so that the antenna 28 communicates with the base 12 from a remote location. The antenna 28 may be placed atop the user's home or building or the antenna 28 may be placed, for example, on top of an antenna tower adjacent to the user's home or building.

The base 12 also includes other means for the user to interface with the cellular telephone and the call management software located in the base 12. The user interfaces may include a plurality of touch screen buttons or other buttons located on the base 14. In an exemplary embodiment, the base may include a set button 21, a mode button 11, a scroll down button 17, a scroll up button 15, and a clear button 19. These buttons may be used as described below.

In one embodiment, the user plugs the base unit into a power supply and then activates an On/Off switch to the On position. The user then presses the Set button 21 and the LCD/LED display 18 is energized. By pressing the Mode button 11, "Anytime" is displayed in the display 18. The user then may press the Up scroll button 15 repeatedly until the number of monthly Anytime minutes the user has contracted for per month appears in the display window 18. In one example, numbers may be displayed in increments of 50. The user can decrease the number displayed by pressing the Down scroll button, which decreases the number in increments, such as by 50 increments each time the button is pressed. When the correct number appears in the display 18, the user presses the Set button 21.

The user then may press the Mode button 11, and "Night/Weekend" appears in the display 18. The user may then press the Up scroll button 15 repeatedly to enter the correct number of monthly night and weekend minutes that the user has contracted for with their wireless provider. The night and weekend amounts may be, for example, displayed in increments of 250. The total display can be decreased by the user pressing the Down scroll button 17. The display 18 then displays "M–F Start." The user then presses the Up scroll button 15 to increase the number displayed, or the user presses the Down scroll button to decrease the entry in increments of 1 through 12, which represents the PM hours. When the proper number appears, the user presses the Set button 21.

The display button then displays "M–F End." The user then presses the Up scroll button 15 or the Down scroll button 17 to decrease the entry in increments of 1 through 12, representing the AM hours. When the correct number appears in the display 18, the user presses the Set button 21. The unit is now programmed for the user's time period of night minutes allowed for use during weekdays.

The display window then displays "Weekend–Fri Start." The user then presses the Up scroll button to increase the entry in increments of 1–12 representing PM hours. When the correct number appears, corresponding to the commencement of user's allotment of weekend minutes, user presses the Set button. The display now displays "Weekend–Mon. End." The user presses the Down scroll button to decrease the entry in increments of 1–12 representing AM hours. When the correct number appears, corresponding to the end of user's allotment of weekend minutes, user presses the Set button. The unit is now programmed for the user's time period of weekend minutes allowed for use during weekends.

The display window then displays "Billing Month." The user presses the Up scroll button 15 to increase the amount displayed, or the user presses the Down scroll button 17 to decrease the entry displayed in increments of 1 through 12, representing the months of the year. When the correct number appears in the display 18, the user presses the Set button 21.

The display window then shows "Billing Start." The user then presses the Up scroll button 15 to increase the amount displayed, or the user presses the Down scroll button 17 to decrease the entry in increments of one through 31, which represents the day of the month when the billing period by the service provider starts. When the correct number appears, the user presses the Set button 21.

The display 18 then shows "Billing End," The user then presses the Up scroll button 15 to increase the number displayed, or presses the Down scroll button 17 to decrease the entry displayed in increments of 1 through 31, which represents the day of the month when the billing period ends. When the correct number appears, the user presses the Set button 21. In the alternative, software accounts for the billing end period based on the billing start entry by the user.

The cellular telephone is then placed in the receiver 13, and the cellular telephone is activated to display call information in its display. The user then presses the Mode button 11 and the system microprocessor sorts the call information time, date, and minutes from the cellular telephone to display certain totals in the display window 18. The display 18 will show totals for the monthly billing period, for example:

Anytime min. XX
Night W/E min. YY
Total min. zz

Above, the "XX", "YY", and "ZZ" are representative only and according to the present disclosure the appropriate minutes for each category would be illustrated or shown in the display 18.

The user then presses the Clear button 19 to erase the data for the period displayed. This will reset the device to show data for the next consecutive monthly billing period, or as prescribed by the software or the user.

Figure 2:
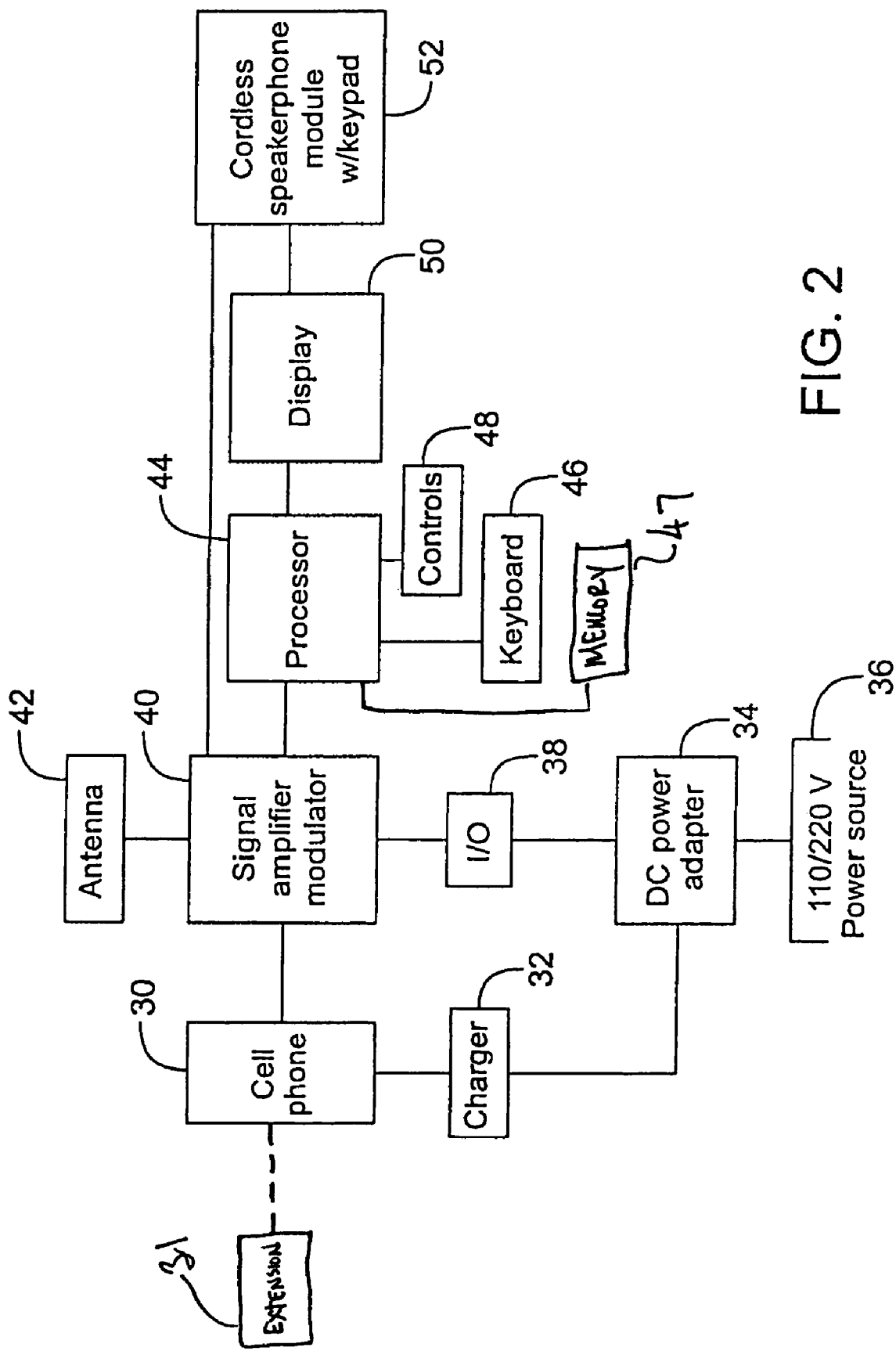
FIG. 2 is a schematic block diagram of the multi-functional base unit and system according to the present disclosure.

FIG. 2 illustrates an exemplary schematic block diagram of the system of the present disclosure with a cellular telephone 30 connected to a charger 32. The charger receives power from a DC power adapter 34, which is connected to a power source 36. Also connected to the DC power adapter 34 is an input/output junction 38, which in turn is connected to a signal amplifier and modulator 40. The signal amplifier and modulator 40 amplifies a signal fed from a remote antenna 42. The signal amplifier and modulator 40 is also connected to a microprocessor 44, which in turn is electronically connected to a keyboard 46 and electronic controls 48. The display 50 is connected to the microprocessor 44 and electronically connected to the display and the signal amplifier and modulator is the speakerphone module with keypad 52. In addition, the system may include at least one, or several, extensions 31 so that at the location that the system of the present disclosure is utilized, multiple portable handsets may be utilized with one incoming cellular signal that is multiplied by the signal amplifier and modulator 40. The telecommunication system disclosed herein further includes a memory module 47 which may be resetable, and which stores information that is particular to the user and the user's particular cellular subscription plan. The system is further adapted to accept information from the user such as the user's billing cycle and minute categories allowed according to the user's cellular subscription plan, as further described below. The memory module 47 may further include random access memory or RAM or other memory so as to store information as downloaded from the last download cycle from the portable cellular handset 30 to the processor 44. Therefore, even though the handset 14 may be removed from the base unit 12, the user may still review the latest download information from the handset 14 on the display 18.

Figure 3:
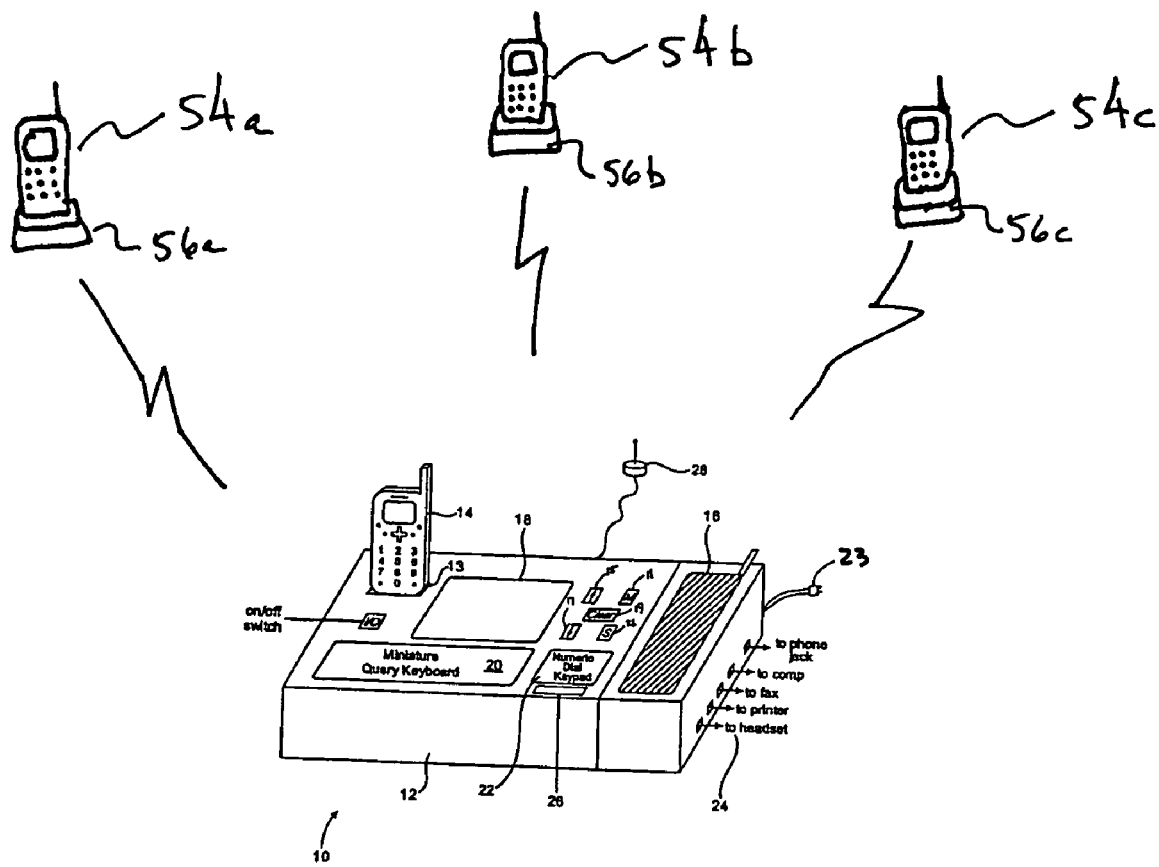
FIG. 3 illustrates a multi-functional base unit according to the present disclosure with multiple extension handsets.

FIG. 3 illustrates a plurality of extension telephones 54A-54C that are electronically connected to the base unit 12 to further comprise the telecommunication system of the present disclosure. The extensions 54A-54C may be hard-wired to the base unit 12, or may operate on a frequency that allows the extensions to be wirelessly connected to the base unit 12. The extension base units 56A-56C, which correspond with the corresponding handset extensions may also be used as power charging units that may be plugged into an electrical outlet with the appropriate electrical cord and outlet, such as AC cord 23 of base unit 12.

The telecommunication system illustrated in FIG. 3 allows for the system to receive wireless incoming telephone calls, and allows for the user to place outgoing telephone calls utilizing a wireless cellular network.

Figure 4:
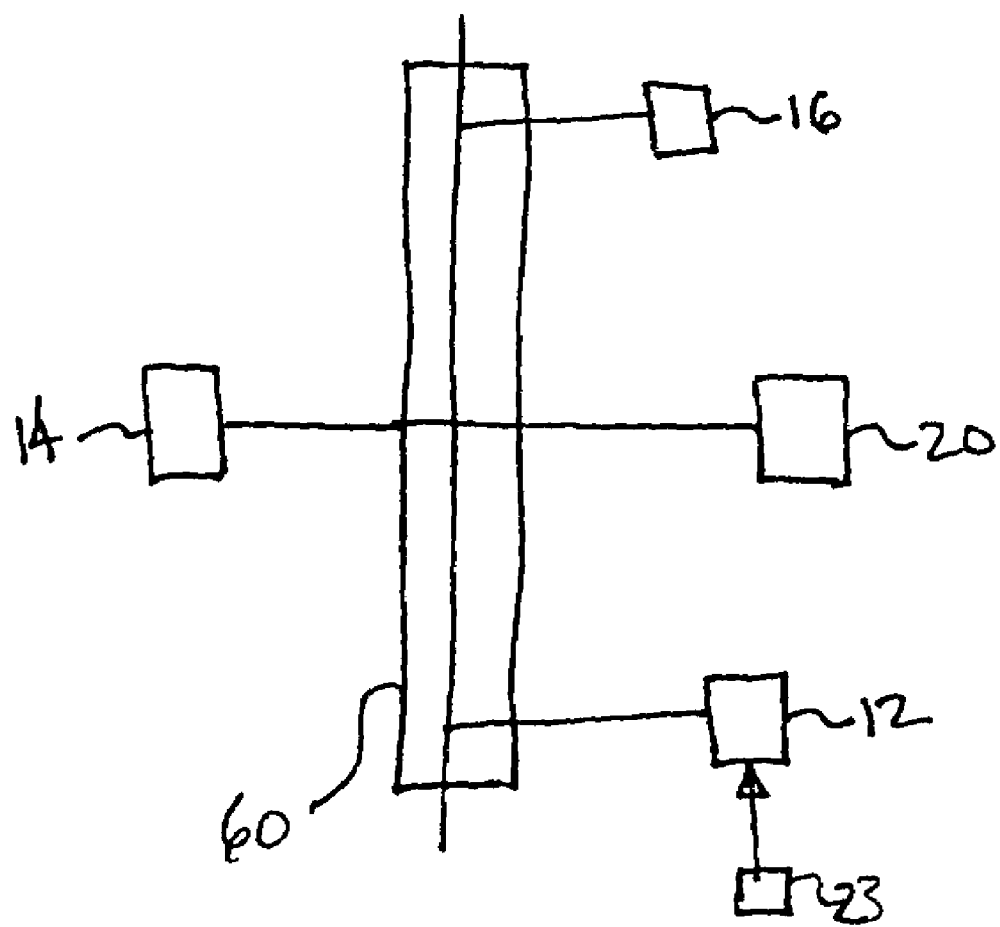
FIG. 4 illustrates a schematic representation of a circuit diagram of the multi-functional base unit according to the present disclosure.

FIG. 4 illustrates a schematic representation of the telecommunication systems disclosed herein, wherein a signal bus 60 is utilized to connect the portable handset 14 to the keyboard 20, as well as the cordless handset 16 and the base unit 12.

Figure 5:
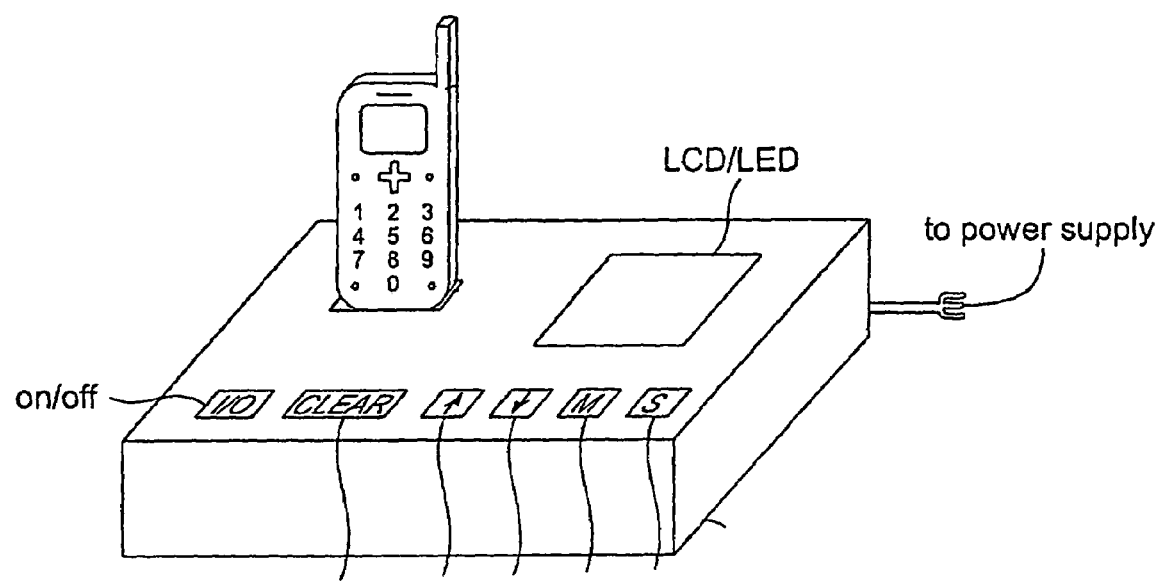
FIG. 5 illustrates another embodiment of the telecommunication system disclosed.

FIG. 5 illustrates another embodiment similar to the embodiment shown in FIG. 1, however the cordless phone 16 and recess for same are shown removed from the base unit.

The software and the microprocessor of the present disclosure provides a system and method for downloading and analyzing call information data from the cellular telephone and provides a mechanism to assemble that data into certain categories to track usage within the defined parameters, according to the user's subscription with the wireless carrier. These predefined parameters may include total anytime minutes, total night and weekend minutes and total prime time minutes. All these parameters are tracked within the time period entered into the disclosed system by the user, which coincides with the billing period according to the user's subscription. The present disclosure saves time for the user, and provides a more efficient and effective means for the user to manage their call minute units, by allowing the user access to the same information at the will of the user.

As wireless subscription services increase in popularity, the system according to the present disclosure may be programmed to accommodate additional demands for more information. This includes, but is not limited, assembling data to track call minutes made, such as calls made from a wireless cellular telephone to other wireless cellular telephones, and also for tracking call minutes for browser access within the same parameters of anytime, night/weekend, and total minutes, or any other way that the minutes may be billed by the subscriber's service provider.

By providing access to information that is stored in the user's cellular telephone, the usability and functionality of the user's cellular telephone is enhanced and more user friendly. The present disclosure also benefits the sellers and service providers of cellular telephones, because more people will be more interested in purchasing and utilizing their cellular telephones with the enhanced features of the present disclosure.

The software and tracking methods disclosed herein also may be offered in the future to wireless telephone manufacturers as an item that may be built into future wireless telephones as an added feature.

Although this disclosure has been shown and described with respect to detailed embodiments, those skilled in the art will understand that various changes in form and detail may be made without departing form the scope of the claimed disclosure.

What is claimed is:

1. A telecommunication system, comprising:
   a portable handset;
   a base unit having a recess for the portable handset;
   a processor included in the base unit for downloading and processing call information from the portable handset, the call information comprising at least one of a call time, a call date, or a call duration;
   a display for displaying information processed by the processor and based on the call information; and
   controls on the base unit configured to receive at least one parameter used by the processor to process the call information.

2. The telecommunication system according to claim 1, wherein the portable handset is a cellular telephone.

3. The telecommunication system of claim 2, further comprising, a cordless telephone, with a base unit having a second recess for the cordless telephone.

4. The telecommunication system of claim 1, further comprising a keypad for communicating with the portable handset or the base unit.

5. The telecommunication system according to claim 4, wherein the telecommunication system is adapted to allow a user to communicate with the portable handset and to set parameters in the base unit that correspond to the user's cellular subscription.

6. The telecommunication system according to claim 1, further comprising a remote antenna connected to the base unit to provide a signal to the base unit.

7. The telecommunication system of claim 6, wherein the signal is a cellular signal.

8. The telecommunication system according to claim 7, wherein the base unit further comprises a signal amplifier.

9. The telecommunication system of claim 1 further comprising a plurality of output or input jacks adapted to connect the base unit with peripheral equipment.

10. The telecommunication system of claim 9, wherein the output or input jacks include an input jack for connecting the base unit to a land telephone line.

11. The telecommunication system according to claim 1, further comprising at least one extension handset.

12. The telecommunication system of claim 1, wherein the information includes minutes used or minutes available under a particular cellular subscription.

13. A method of managing cellular telephone information associated with a particular cellular subscription, comprising:
   providing a portable cellular handset and a base unit having a recess for the portable cellular handset, the base unit including a processor for processing information from the portable cellular handset, and the base unit further having a display for displaying information processed by the processor;
   downloading call information from the portable cellular handset to the base units, the call information comprising at least one of a call time, a call date, or a call duration;
   processing the call information downloaded from the portable cellular handset based on control data stored in the base unit to generate processed information;
   displaying the processed information generated from the call information downloaded from the portable cellular handset on the display; and
   providing controls on the base unit for manipulating the call information downloaded from the portable handset, and for manipulating the control data.

14. The method of claim 13, wherein the user sets parameters in the control data stored in the base unit that correspond with the user's cellular subscription.

15. The method of claim 14, wherein the user's set parameters comprises at least one of the user's anytime minutes, total night minutes, weekend minutes, or total prime time minutes according to the user's cellular subscription.

16. The method according to claim 14, wherein the set parameters further include a billing period according to the user's cellular subscription.

17. The method according to claim 14, wherein set parameters are resetable by the user either manually or automatically based upon the user's billing period.

18. A telecommunication system to be used with a cellular telephone network at a fixed location, comprising:
   a portable cellular handset;
   a base unit having a recess for the portable cellular handset;
   a processor included in the base unit for downloading, via at least one electrical connection in the recess, and processing call information from the portable cellular handset, the call information comprising at least one of a call time, a call date, or a call duration;
   a display for displaying information processed by the processor and based on the call information; and
   controls on the base unit configured to receive at least one parameter used by the processor to process the call information.

19. The telecommunication system of claim 18, wherein the processor further includes a memory module, for storing input information.

20. The telecommunication system of claim 19, wherein the memory module is adapted to store information relating to a particular cellular subscription.

21. The telecommunication system of claim 18, further comprising a remote antenna connected to the base unit to provide a signal to the base unit.

* * * * *